United States Patent
Chen et al.

(10) Patent No.: US 9,510,301 B2
(45) Date of Patent: Nov. 29, 2016

(54) METHOD AND APPARATUS FOR ADJUSTING TRANSMIT POWER

(71) Applicant: Huawei Technologies Co., Ltd., Shenzhen, Guangdong (CN)

(72) Inventors: Zihuan Chen, Chengdu (CN); Dafeng Tian, Chengdu (CN); Jun Ma, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/081,185

(22) Filed: Mar. 25, 2016

(65) Prior Publication Data

US 2016/0212715 A1 Jul. 21, 2016

Related U.S. Application Data

(63) Continuation of application No. PCT/CN2013/084421, filed on Sep. 27, 2013.

(51) Int. Cl.
| | |
|---|---|
| H04B 7/00 | (2006.01) |
| H04W 52/24 | (2009.01) |
| H04W 52/26 | (2009.01) |
| H04W 40/12 | (2009.01) |
| H04W 28/02 | (2009.01) |
| H04W 52/04 | (2009.01) |
| H04W 36/30 | (2009.01) |

(52) U.S. Cl.
CPC ....... *H04W 52/243* (2013.01); *H04W 28/0236* (2013.01); *H04W 36/30* (2013.01); *H04W 40/12* (2013.01); *H04W 52/04* (2013.01); *H04W 52/241* (2013.01); *H04W 52/245* (2013.01); *H04W 52/246* (2013.01); *H04W 52/26* (2013.01); *H04W 52/265* (2013.01)

(58) Field of Classification Search
None
See application file for complete search history.

(56) References Cited

U.S. PATENT DOCUMENTS

| | | | | |
|---|---|---|---|---|
| 5,710,982 A | * | 1/1998 | Laborde | H04B 7/18543 455/69 |
| 6,466,609 B2 | * | 10/2002 | Koslar | H03K 7/04 375/139 |
| 6,898,437 B1 | * | 5/2005 | Larsen | H04L 43/08 455/127.2 |
| 7,062,287 B2 | * | 6/2006 | Nakamura | H04W 52/12 370/318 |
| 7,257,408 B2 | * | 8/2007 | Kikuchi | H04W 88/06 370/332 |
| 7,957,486 B2 | * | 6/2011 | Petrus | H04L 1/0026 375/295 |

(Continued)

FOREIGN PATENT DOCUMENTS

| | | |
|---|---|---|
| CN | 101577960 A | 11/2009 |
| CN | 101583181 A | 11/2009 |

(Continued)

*Primary Examiner* — Dominic Rego (57) ABSTRACT

The present invention relates to the field of information communication and control, and discloses a method and an apparatus for adjusting transmit power and used to resolve a problem of interference between paths in a multipath system. The method provided by the present invention specifically includes: determining a path with worst signal quality according to signal quality information of each path; then, increasing transmit power of the path, or, decreasing transmit power of at least one path that produces strongest interference to the path with the worst signal quality; and finally, using a manner of cyclically adjusting signal transmit power to enable interference between the paths to meet a requirement of not affecting communications quality, thereby resolving a problem of interference between paths in a multipath system. Embodiments of the present invention are mainly used in a data transmission process in a multipath system.

8 Claims, 3 Drawing Sheets

(56) References Cited

U.S. PATENT DOCUMENTS

| | | | | |
|---|---|---|---|---|
| 8,036,186 B2* | 10/2011 | Gupta | ................... | H04W 52/10 |
| | | | | 370/252 |
| 8,135,428 B2* | 3/2012 | Shinozaki | .............. | H04B 7/022 |
| | | | | 370/318 |
| 8,160,633 B2* | 4/2012 | Satou | ................... | H04W 52/40 |
| | | | | 455/522 |
| 8,682,376 B2* | 3/2014 | Franceschini | ......... | H04W 52/08 |
| | | | | 455/522 |
| 9,019,905 B2* | 4/2015 | Kazmi | ................ | H04W 52/146 |
| | | | | 370/252 |
| 2003/0067883 A1* | 4/2003 | Azenkot | ............ | H04N 7/17309 |
| | | | | 370/252 |
| 2003/0109221 A1* | 6/2003 | You | ....................... | H04W 52/08 |
| | | | | 455/13.4 |
| 2005/0208959 A1* | 9/2005 | Chen | ....................... | H04W 4/06 |
| | | | | 455/515 |
| 2007/0066241 A1* | 3/2007 | Hart | ...................... | H04W 52/34 |
| | | | | 455/69 |
| 2007/0147308 A1* | 6/2007 | Hart | .................... | H04W 52/241 |
| | | | | 370/332 |
| 2008/0080632 A1* | 4/2008 | Kim | ....................... | H04L 1/0687 |
| | | | | 375/267 |
| 2008/0108315 A1* | 5/2008 | Hamalainen | .......... | H04W 52/12 |
| | | | | 455/127.1 |
| 2012/0142392 A1* | 6/2012 | Patel | ................... | H04W 52/143 |
| | | | | 455/522 |
| 2013/0223324 A1* | 8/2013 | Somasundaram | .... | H04W 16/26 |
| | | | | 370/315 |
| 2015/0189669 A1 | 7/2015 | Huang et al. | | |

FOREIGN PATENT DOCUMENTS

| | | |
|---|---|---|
| CN | 102056279 A | 5/2011 |
| CN | 102891708 A | 1/2013 |

\* cited by examiner

METHOD AND APPARATUS FOR ADJUSTING TRANSMIT POWER

CROSS-REFERENCE TO RELATED APPLICATIONS

This application is a continuation of International Application No. PCT/CN2013/084421, filed on Sep. 27, 2013, which is hereby incorporated by reference in its entirety.

TECHNICAL FIELD

The present invention relates to the field of information communication and control, and in particular, to a method and an apparatus for adjusting transmit power.

BACKGROUND

A microwave communications technology is mainly applied to a wireless communications scenario with a demand of large bandwidth. In the microwave communications technology, a multipath communications technology is a communications technology that is relatively common, and in the multipath communications technology, each path uses a similar spatial channel, and therefore, interference exists between the paths. When the interference is relatively strong, correct transmission of data inside each path is affected, leading to a communication failure; therefore, how to cancel the interference between the paths is a problem to be resolved urgently.

SUMMARY

Embodiments of the present invention provide a method and an apparatus for adjusting transmit power, which are used to resolve a problem of interference between paths in a multipath communications system.

In order to achieve the foregoing objective, the following technical solutions are used in the embodiments of the present invention:

According to a first aspect, an embodiment of the present invention provides a method for adjusting transmit power, applied to a multipath system, including:

acquiring signal quality information of each path, where the signal quality information is used to indicate a difference between actual received signal quality and ideal received signal quality of a single path;

determining a path with worst signal quality according to the signal quality information of each path, where in all the paths, the path with the worst signal quality is a path with a maximum difference between actual received signal quality and ideal received signal quality when a maximum difference between signal quality information of every two paths does not meet a preset condition;

increasing transmit power of the path with the worst signal quality, or, decreasing transmit power of at least one path that produces strongest interference to the path with the worst signal quality; and sequentially repeating the foregoing steps until the maximum difference between the signal quality information of the every two paths in all the paths meets the preset condition.

With reference to the first aspect, in a first possible implementation manner of the first aspect, before the decreasing transmit power of at least one path that produces strongest interference to the path with the worst signal quality, the method further includes:

acquiring a channel parameter of each path, where the channel parameter is used to indicate a channel amplitude of each path; and determining, according to the channel parameter of each path, the at least one path that produces the strongest interference to the path with the worst signal quality.

With reference to the first possible implementation manner of the first aspect, in a second possible implementation manner, the increasing transmit power of the path with the worst signal quality includes:

increasing current transmit power of the path with the worst signal quality by at least one first rated amplitude value; and the decreasing transmit power of at least one path that produces strongest interference to the path with the worst signal quality includes:

decreasing, by at least one second rated amplitude value, current transmit power of the at least one path that produces the strongest interference to the path with the worst signal quality.

With reference to the second possible implementation manner of the first aspect, in a third possible implementation manner, the decreasing, by at least one second rated amplitude value, current transmit power of the at least one path that produces the strongest interference to the path with the worst signal quality includes:

decreasing, by at least one second rated amplitude value, current transmit power of one path that produces strongest interference to the path with the worst signal quality; and meanwhile, decreasing by at least one third rated amplitude value for at least one of other paths that produce interference to the path with the worst signal quality than the one path that produces the strongest interference.

According to a second aspect, an embodiment of the present invention provides an apparatus for adjusting transmit power, applied to a multipath system, where the apparatus includes:

an acquiring unit, configured to acquire signal quality information of each path, where the signal quality information is used to indicate a difference between actual received signal quality and ideal received signal quality of a single path;

a determining unit, configured to determine a path with worst signal quality according to the signal quality information of each path that is acquired by the acquiring unit, where in all the paths, the path with the worst signal quality is a path with a maximum difference between actual received signal quality and ideal received signal quality when a maximum difference between signal quality information of every two paths does not meet a preset condition; and a power adjustment unit, configured to increase transmit power of the path with the worst signal quality that is determined by the determining unit, or, configured to decrease transmit power of at least one path that produces strongest interference to the path with the worst signal quality.

With reference to the second aspect, in a first possible implementation manner, the acquiring unit is further configured to acquire a channel parameter of each path, where the channel parameter is used to indicate a channel amplitude received on each path; and the determining unit is further configured to determine, according to the channel parameter of each path that is acquired by the acquiring unit, the at least one path that produces the strongest interference to the path with the worst signal quality.

With reference to the first possible implementation manner of the second aspect, in a second possible implementation manner, the power adjustment unit is specifically configured to increase current transmit power of the path with the worst signal quality by at least one first rated amplitude value; and configured to decrease, by at least one second rated amplitude value, current transmit power of the at least one path that produces the strongest interference to the path with the worst signal quality.

With reference to the second possible implementation manner of the second aspect, in a third possible implementation manner, the power adjustment unit is further specifically configured to decrease, by at least one second rated amplitude value, current transmit power of one path that produces strongest interference to the path with the worst signal quality; and configured to decrease by at least one third rated amplitude value for at least one of other paths that produce interference to the path with the worst signal quality than the one path that produces the strongest interference.

According to a method and an apparatus for adjusting transmit power that are provided by the embodiments of the present invention, a path with worst signal quality is determined according to signal quality information of each path; then, transmit power of the path is increased, which is used to increase a signal-to-noise ratio of the path; and in order to fully consider mutual impacts between channels of all the paths, signal transmit power is cyclically adjusted to enable a maximum difference between signal quality information of every two paths in all the paths to meet a requirement of a preset condition, thereby resolving a problem of interference between channels in a multipath system.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
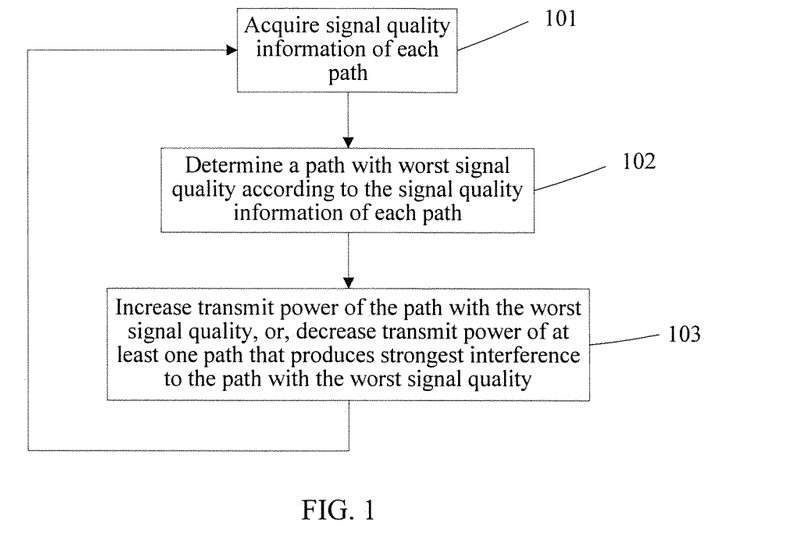
FIG. 1 is a flowchart of a method for adjusting transmit power according to an embodiment of the present invention.

An embodiment of the present invention provides a method for adjusting transmit power, applied to a multipath system. The multipath system refers to a system using multiple spatial paths to transmit and receive data, for example, polarization multiplexing, or MIMO. An interaction process thereof is shown in FIG. 1, and specifically includes:

101: Acquire signal quality information of each path.

The signal quality information is used to indicate a difference between actual received signal quality and ideal received signal quality of a single path. The difference may be indicated by using a mean square error (MSE) or a bit error rate of a signal, or indicated by using a parameter that can reflect signal transmission quality of a path.

The actual received signal quality refers to quality of an actual signal that is received by a receive end after the signal is sent from a transmit end and transmitted to the receive end through an actual path, and correspondingly, the ideal received signal quality refers to quality of a signal that is received by the receive end after the signal is sent from the transmit end and transmitted to the receive end through an ideal path with no noise. Certainly, the actual path and the ideal path with no noise refer to two states of a same path.

102: Determine a path with worst signal quality according to the signal quality information of each path.

In all the paths, the path with the worst signal quality is a path with a maximum difference between actual received signal quality and ideal received signal quality when a maximum difference between signal quality information of every two paths does not meet a preset condition.

The preset condition is used to indicate a value range that the maximum difference between the signal quality information of the every two paths in all the paths needs to reach finally, for example, it is required that a difference value between MSEs of the every two paths in all the paths be within 2 dB, or it is required that a bit error rate of a signal transmitted through each path be less than 10e-8.

In addition, it should be noted that, before the path with the worst signal quality is determined, if the maximum difference between the signal quality information of the every two paths in all the paths meets the preset condition, a signal is sent at current transmit power; otherwise, the path with the worst signal quality is determined, and signal power is adjusted.

103: Increase transmit power of the path with the worst signal quality, or, decrease transmit power of at least one path that produces strongest interference to the path with the worst signal quality.

In this embodiment of the present invention, in order to resolve a problem of interference between channels in a multipath communications system, the foregoing step 101 to step 103 need to be sequentially repeated until the maximum difference between the signal quality information of the every two paths in all the paths meets the preset condition. Certainly, adjustment may also be performed only once to enable the maximum difference between the signal quality information of the every two paths in all the paths to meet the preset condition. This needs to be determined according to an actual situation.

As can be seen from a description of step 103, the present invention provides two manners of adjusting transmit power.

The first manner is a manner of increasing the transmit power of the path with the worst signal quality.

The second manner is a manner of decreasing the transmit power of the at least one path that produces the strongest interference to the path with the worst signal quality.

In a process of performing step 103, a selection on the two manners is not limited, that is, in an execution process, a manner may be selected in a random manner to adjust the transmit power.

Certainly, in addition to the randomly selected manner, a selection condition may also be set in this embodiment of the present invention, for example, when the transmit power of the path with the worst signal quality cannot be increased or has reached maximum rated transmit power, but the maximum difference between the signal quality information of the every two paths in all the paths still cannot meet the preset condition, only the second manner can be selected to adjust the transmit power. Similarly, when the transmit power of the at least one path that produces the strongest interference to the path with the worst signal quality cannot be decreased or is already minimum transmit power, but the maximum difference between the signal quality information of the every two paths in all the paths still cannot meet the preset condition, only the first manner can be selected to adjust the transmit power.

In this implementation manner, a path with worst signal quality is determined according to quality information of each path; then, transmit power of the path with the worst signal quality is increased, or, transmit power of at least one path that produces strongest interference to the path with the worst signal quality is decreased; and methods in the three steps are repeatedly performed, so that an anti-interference capability of the path with the worst signal quality is enhanced, and an impact of each path on the path with the worst signal quality is reduced, thereby resolving a problem of interference between channels in a multipath communications system.

Figure 2:
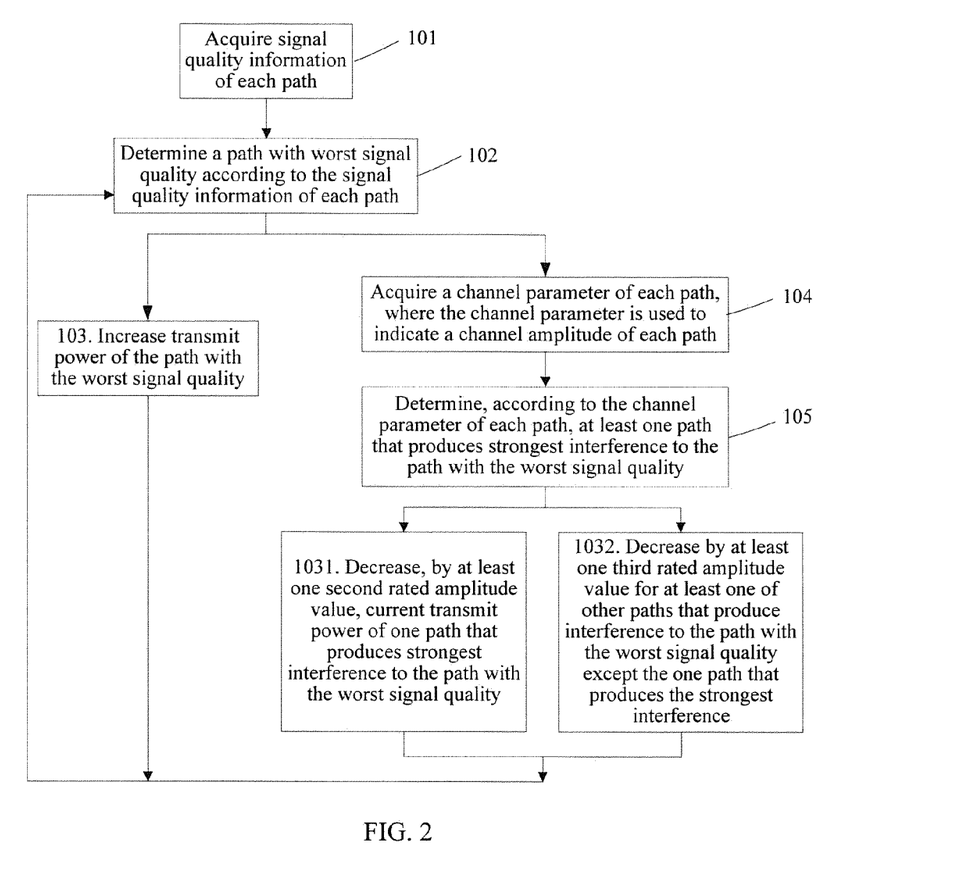
FIG. 2 is a flowchart of a specific implementation method for adjusting transmit power according to an embodiment of the present invention.

In order to determine, in multiple paths, a path that produces strongest interference to the path with the worst signal quality, further, after step 102 is performed and before the step of decreasing transmit power of at least one path that produces the strongest interference to the path with the worst signal quality in step 103, the present invention further provides the following procedure of a specific implementation method, which is specifically shown in FIG. 2, and includes:

104: Acquire a channel parameter of each path.

The channel parameter is used to indicate channel amplitudes of a direct channel and an interference channel, where the direct channel is used to indicate a channel for transmitting a wanted signal, and the interference channel is used to indicate a channel for transmitting an interference signal. The wanted signal refers to a signal that is expected to be received by a receive end of a single path, and the interference signal refers to a signal sent by transmit ends of all other paths and received by the receive end of the single path other than the signal that is expected to be received.

The channel parameter generally may be indicated by using a channel transmission matrix, and in this embodiment, only a channel amplitude in a channel transmission matrix is used.

In order to more clearly describe the meanings of the direct channel and the interference channel, an example is provided as follows:

When a system has 4 paths, a signal sent by a transmit end of a path 1 and received by a receive end of the path 1 is a wanted signal, and for the path 1, a channel between the receive end and the transmit end of the path 1 is a direct channel; and correspondingly, signals sent by transmit ends of paths 2, 3, and 4 and received by the receive end of the path 1 are interference signals, and channels for transmitting the signals of the paths 2, 3, and 4 to the receive end of the path 1 are interference channels.

105: Determine, according to the channel parameter of each path, the at least one path that produces the strongest interference to the path with the worst signal quality.

In this embodiment, the path that produces the strongest interference to the path with the worst signal quality refers to a path that corresponds to a strongest one of signals of other paths that can be received by the path with the worst signal quality.

In this implementation manner, the at least one path that produces the strongest interference to the path with the worst signal quality is determined according to the channel parameter of each path, and at least one path with worst signal quality is obtained, which provides a implementation possibility for adjusting power in a subsequent step.

In another implementation manner of this embodiment of the present invention, a description of a specific implementation manner of step 103 is provided, which specifically includes:

A specific implementation manner of increasing the transmit power of the path with the worst signal quality is: increasing current transmit power of the path with the worst signal quality by at least one first rated amplitude value.

The first rated amplitude value may be set to a fixed value or a change rate.

Correspondingly, a specific implementation manner of decreasing the transmit power of the at least one path that produces strongest interference to the path with the worst signal quality is: decreasing, by at least one second rated amplitude value, current transmit power of the at least one path that produces the strongest interference to the path with the worst signal quality.

A method for setting the second rated amplitude value is the same as that for setting the first rated amplitude value, but a specifically set value or change rate may not be the same.

In addition, it should be noted that, the first rated amplitude value and the second rated amplitude value are set according to a difference between a maximum difference value between the signal quality information of the every two paths in all the paths and the preset condition. A smaller difference indicates smaller values of the first rated amplitude value and the second rated amplitude value. A larger difference indicates that the values of the first rated amplitude value and the second rated amplitude value can be set to be relatively larger, and certainly, may also be set to be smaller; however, this may cause that the steps are repeatedly performed for more times; therefore, it takes a longer time for the maximum difference between the signal quality information of the every two paths in all the paths to meet the preset condition, but the adjustment is more accurate.

In this implementation manner, transmit power is adjusted as needed by using a method, which is selected when the transmit power is adjusted, for setting a power increment, so that an adjustment amplitude of transmit power of each path is refined, and adjustment accuracy is improved, thereby making adjustment on interference between paths also be more accurate.

It should be particularly noted that, when there are multiple paths that produce interference to the path with the worst signal quality and interference strengths are different from one another, for this case, this embodiment of the present invention further provides another specific implementation manner for an adjustment manner of decreasing the transmit power of the at least one path that produces the strongest interference to the path with the worst signal quality in step 103, which, as shown in FIG. 2, includes:

1031: Decrease, by at least one second rated amplitude value, current transmit power of one path that produces strongest interference to the path with the worst signal quality.

1032: Decrease by at least one third rated amplitude value for at least one of other paths that produce interference to the path with the worst signal quality than the one path that produces the strongest interference.

The third amplitude value may be generally set to a power increment less than the second amplitude value. For other paths that produce interference to the path with the worst signal quality, according to a descending order of strengths of interference produced to the path with the worst signal quality, transmit power of the paths is sequentially decreased in descending order of rated amplitude values. When interference from other paths that produce interference to the path with the worst signal quality is far (which is generally considered to be more than 15 dB) less than interference from a path that produces strongest interference to the path with the worst signal quality, the third rated amplitude value may be set to 0.

It should be noted that, steps 1031 and 1032 are simultaneously performed.

In this implementation manner, in this implementation manner, transmit power is adjusted as needed by using a method, which is selected when the transmit power is adjusted, for setting a power increment, so that an adjustment amplitude of transmit power of each path is refined, and transmit power of multiple paths that produce interference may also be adjusted at the same time, thereby further reducing interference between channels.

Herein, in this embodiment of the present invention, a 4*4 MIMO system is used as an example to specifically elaborate the procedure of the foregoing method, which is specifically as follows:

For example, in 4*4 MIMO, there are in total 4 paths for transmitting a signal, and signal quality information of the 4 paths is indicated by using MSEs.

Therefore, the MSEs of the four paths are separately are an MSE 1, an MSE 2, an MSE 3, and an MSE 4.

A path with worst signal quality is obtained according to values of the MSEs of the 4 paths, for example, a difference value between the MSEs of the four paths does not meet a requirement of being less than 2 dB, and in the MSEs of the four paths, a value of the MSE 2 is the largest, which indicates that a difference between an actual received signal and an ideal received signal of the second path is the largest; therefore, the path with the worst signal quality is the second path.

Therefore, transmit power may be adjusted in the following two manners, and before the adjustment, an adjustment manner therein may be selected first in a random manner to perform adjustment once.

Manner 1: Transmit power of the second path is increased according to the first rated amplitude value, for example, the transmit power of the second path is increased according to an amplitude value of 3 dB, until a requirement that an absolute value of the MSE 2 is less than 1 dB is met. If the transmit power of the second path has been adjusted to be the largest or is already maximum power, but in the four paths, a difference value between MSEs of every two paths still does not meet the requirement of being less than 2 dB, manner 2 needs to continue to be performed to perform subsequent adjustment.

Alternatively, manner 2: Interference information of each path is acquired and used to determine paths that produce interference to the path with the worst signal quality, and then, transmit power of these interference paths is decreased.

For example, a 4*4 channel matrix H is used to indicate the interference information of the paths, and the matrix H is as follows:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

where $h_{11}$, $h_{22}$, $h_{33}$, and $h_{44}$ separately are amplitudes of signals to be transmitted by the 4 paths. So, $h_{21}$, $h_{23}$, and $h_{24}$ respectively are an amplitude of an interference channel from the first path to the second path, an amplitude of an interference channel from the third path to the second path, and an amplitude of an interference channel from the fourth path to the second path. If $h_{21} > h_{23} > h_{24}$, t indicates that interference from the first path to the second path is the strongest.

Then, transmit power of a signal of the first path is decreased according to the second rated amplitude value, for example, the transmit power of the signal of the first path is decreased according to the second rated amplitude value 2 dB. Meanwhile, transmit power of a signal of the third path and a signal of the fourth path is also decreased, for example, the transmit power of the signal of the third path is decreased according to 2 dB, twice the third rated amplitude value, and the transmit power of the signal of the fourth path is decreased according to the third rated amplitude value 1 dB.

Similarly, if the transmit power of the first path has been adjusted to be the smallest or is already minimum power, but in the four paths, the difference value between the MSEs of the four paths still does not meet the requirement of being less than 2 dB, manner 1 needs to continue to be performed to perform subsequent adjustment.

The foregoing procedure is targeted to adjustment on the signal of the second path, after the adjustment on the signal of this path is finished, the foregoing steps further need to be sequentially repeated, until a maximum difference value between the MSEs of the every two paths can meet a preset condition of being less than 2 dB.

Figure 3:
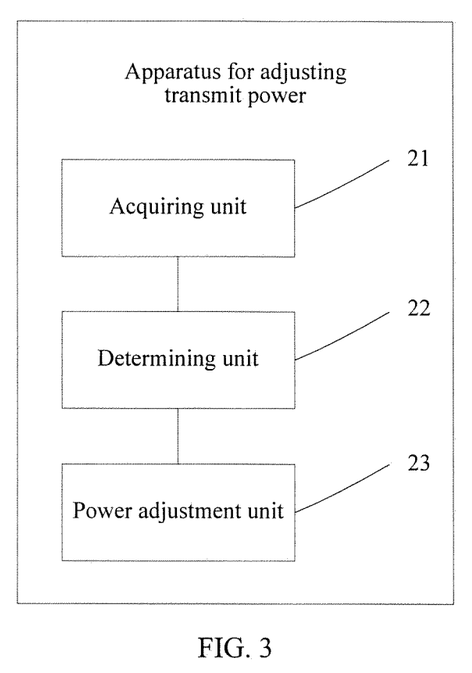
FIG. 3 is a schematic diagram of an apparatus for adjusting transmit power according to an embodiment of the present invention.

Another embodiment of the present invention provides an apparatus for adjusting transmit power, applied to a multipath system, and as shown in FIG. 3, configured to implement the procedure of the method shown in either one of FIG. 1 and FIG. 2. The apparatus includes: an acquiring unit 21, configured to acquire signal quality information of each path, where the signal quality information is used to indicate a difference between actual received signal quality and ideal received signal quality of a single path;

a determining unit 22, configured to determine a path with worst signal quality according to the signal quality information of each path that is acquired by the acquiring unit 21, where the path with the worst signal quality is a path with a maximum difference between actual received signal quality and ideal received signal quality when a difference value between signal quality information of all the paths does not meet a preset condition; and a power adjustment unit 23, configured to increase transmit power of the path with the worst signal quality that is determined by the determining unit 22, or, decrease transmit power of at least one path that produces strongest interference to the path with the worst signal quality.

Optionally, the acquiring unit 21 is further configured to acquire a channel parameter of each path, where the channel parameter is used to indicate a channel amplitude received on each path; and the determining unit 22 is further configured to determine, according to the channel parameter of each path that is acquired by the acquiring unit 21, at least one path that produces strongest interference to the path with the worst signal quality.

Optionally, the power adjustment unit 23 is specifically configured to increase current transmit power of the path with the worst signal quality by at least one first rated amplitude value; and configured to decrease, by at least one second rated amplitude value, current transmit power of the at least one path that produces the strongest interference to the path with the worst signal quality.

Further, optionally, the power adjustment unit 23 is further specifically configured to decrease, by at least one second rated amplitude value, current transmit power of one path that produces strongest interference to the path with the worst signal quality; and configured to decrease by at least one third rated amplitude value for at least one of other paths that produce interference to the path with the worst signal quality than the one path that produces the strongest interference.

An apparatus for adjusting transmit power that is provided by this embodiment of the present invention determines a path with worst signal quality according to signal quality information of each path; then, increases transmit power of the path, which is used to increase a signal-to-noise ratio of the path; and in order to fully consider mutual impacts between channels of all the paths, cyclically adjusts signal transmit power to enable a maximum difference between signal quality information of every two paths in all the paths to meet a requirement of a preset condition, thereby resolving a problem of interference between channels in a multipath system.

Figure 4:
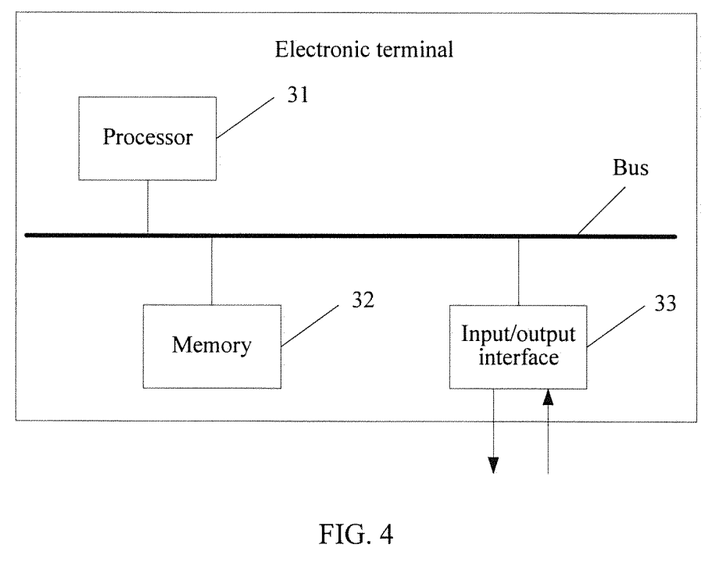
FIG. 4 is a schematic diagram of an electronic terminal according to an embodiment of the present invention.

Another embodiment of the present invention provides an electronic terminal, which needs to be deployed at a receive end and a transmit end of a multipath system, and as shown in FIG. 4, specifically includes a processor 31, a memory 32, and an input/output interface 33. The memory 32 has program code configured, and the processor 31 may invoke the program code to implement the procedure of the method shown in either one of FIG. 1 and FIG. 2. The processor may further use the input/output interface 33 to receive information and send information. Devices communicate with each other by using a bus.

The processor 31 is configured to acquire signal quality information of each path, where the signal quality information is used to indicate a difference between actual received signal quality and ideal received signal quality of a single path; determine a path with worst signal quality according to the signal quality information of each path, where in all the paths, the path with the worst signal quality is a path with a maximum difference between actual received signal quality and ideal received signal quality when a maximum difference between signal quality information of every two paths does not meet a preset condition; increase transmit power of the path with the worst signal quality, or, decrease transmit power of at least one path that produces strongest interference to the path with the worst signal quality; and sequentially repeat the foregoing steps, until the maximum difference between the signal quality information of the every two paths in all the paths meets the preset condition.

The memory 32 is configured to store the signal quality information of each path and the preset condition.

Optionally, the processor 31 is further configured to acquire a channel parameter of each path, where the channel parameter is used to indicate a channel amplitude of each path; and determine, according to the channel parameter of each path, the at least one path that produces the strongest interference to the path with the worst signal quality.

The memory 32 is further configured to store the channel parameter of each path.

Optionally, the processor 31 is further configured to increase current transmit power of the path with the worst signal quality by at least one first rated amplitude value; and configured to decrease, by at least one second rated amplitude value, current transmit power of the at least one path that produces the strongest interference to the path with the worst signal quality.

The memory 32 is further configured to store the first rated amplitude value and the second rated amplitude value.

Optionally, the processor 31 is further configured to decrease, by at least one second rated amplitude value, current transmit power of one path that produces strongest interference to the path with the worst signal quality; and meanwhile, configured to decrease by at least one third rated amplitude value for at least one of other paths that produce interference to the path with the worst signal quality than the one path that produces the strongest interference.

The memory 32 is further configured to store the third rated amplitude value.

An electronic terminal provided by this embodiment of the present invention determines a path with worst signal quality according to signal quality information of each path; then, increases transmit power of the path, which is used to increase a signal-to-noise ratio of the path; and in order to fully consider mutual impacts between channels of all the paths, cyclically adjusts signal transmit power to enable a maximum difference between signal quality information of every two paths in all the paths to meet a requirement of the preset condition, thereby resolving a problem of interference between channels in a multipath system.

Based on the foregoing descriptions of the implementation manners, a person skilled in the art may clearly understand that the present invention may be implemented by software in addition to necessary universal hardware and certainly, may also be implemented by hardware. In most circumstances, the former is a preferred implementation manner. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for adjusting transmit power for use in a multipath system, the method comprising:
    acquiring signal quality information of each path, wherein the signal quality information is used to indicate a difference between actual received signal quality and ideal received signal quality of a single path;
    determining a path with worst signal quality according to the signal quality information of each path, wherein in all the paths, the path with the worst signal quality is a path with a maximum difference between actual received signal quality and ideal received signal quality when a maximum difference between signal quality information of every two paths does not meet a preset condition;
    increasing transmit power of the path with the worst signal quality, or, decreasing transmit power of at least one path that produces strongest interference to the path with the worst signal quality; and
    sequentially repeating the foregoing steps until the maximum difference between the signal quality information of the every two paths in all the paths meets the preset condition.

2. The method according to claim 1, wherein before decreasing transmit power of at least one path that produces strongest interference to the path with the worst signal quality, the method further comprises:
    acquiring a channel parameter of each path, wherein the channel parameter is used to indicate a channel amplitude of each path; and
    determining, according to the channel parameter of each path, the at least one path that produces the strongest interference to the path with the worst signal quality.

3. The method according to claim 2, wherein:
    increasing transmit power of the path with the worst signal quality comprises:
    increasing current transmit power of the path with the worst signal quality by at least one first rated amplitude value; and
    decreasing transmit power of at least one path that produces strongest interference to the path with the worst signal quality comprises:
    decreasing, by at least one second rated amplitude value, current transmit power of the at least one path that produces the strongest interference to the path with the worst signal quality.

4. The method according to claim 3, wherein decreasing, by at least one second rated amplitude value, current transmit power of the at least one path that produces the strongest interference to the path with the worst signal quality comprises:
    decreasing, by at least one second rated amplitude value, current transmit power of one path that produces strongest interference to the path with the worst signal quality; and
    decreasing by at least one third rated amplitude value for at least one of other paths that produce interference to the path with the worst signal quality than the one path that produces the strongest interference.

5. An apparatus for adjusting transmit power for use in a multipath system, the apparatus comprising:
    an acquiring unit, configured to acquire signal quality information of each path, wherein the signal quality information is used to indicate a difference between actual received signal quality and ideal received signal quality of a single path;
    a determining unit, configured to determine a path with worst signal quality according to the signal quality information of each path that is acquired by the acquiring unit, wherein in all the paths, the path with the worst signal quality is a path with a maximum difference between actual received signal quality and ideal received signal quality when a maximum difference between signal quality information of every two paths does not meet a preset condition; and
    a power adjustment unit, configured to increase transmit power of the path with the worst signal quality that is determined by the determining unit, or, configured to decrease transmit power of at least one path that produces strongest interference to the path with the worst signal quality.

6. The apparatus according to claim 5, wherein:
    the acquiring unit is further configured to acquire a channel parameter of each path, wherein the channel parameter is used to indicate a channel amplitude of each path; and
    the determining unit is further configured to determine, according to the channel parameter of each path that is acquired by the acquiring unit, the at least one path that produces the strongest interference to the path with the worst signal quality.

7. The apparatus according to claim 6, wherein the power adjustment unit is configured to:
    increase current transmit power of the path with the worst signal quality by at least one first rated amplitude value; and
    decrease, by at least one second rated amplitude value, current transmit power of the at least one path that produces the strongest interference to the path with the worst signal quality.

8. The apparatus according to claim 7, wherein the power adjustment unit is configured to:
    decrease, by at least one second rated amplitude value, current transmit power of one path that produces strongest interference to the path with the worst signal quality; and
    decrease by at least one third rated amplitude value for at least one of other paths that produce interference to the path with the worst signal quality than the one path that produces the strongest interference.

* * * * *